United States Patent [19]
Koike et al.

[11] Patent Number: 6,109,036
[45] Date of Patent: Aug. 29, 2000

[54] SEALED HYDRAULIC INTENSIFIER

[75] Inventors: Jun Koike, Sunto-gun; Masahiro Tamaki, Susono, both of Japan

[73] Assignee: Toshiba Kikai Kabushiki Kaisha, Tokyo-To, Japan

[21] Appl. No.: 09/124,924

[22] Filed: Jul. 29, 1998

[30] Foreign Application Priority Data

Jul. 29, 1997 [JP] Japan .................................. 9-203591

[51] Int. Cl.⁷ .................................................. B60T 17/22
[52] U.S. Cl. .......................................... 60/534; 545/572
[58] Field of Search .......................... 60/534, 535, 538, 60/545, 571, 572

[56] References Cited

U.S. PATENT DOCUMENTS

| | | | |
|---|---|---|---|
| 2,766,590 | 10/1956 | Erwin et al. ........................ | 60/588 X |
| 3,877,226 | 4/1975 | Blum .................................... | 60/545 |
| 4,024,714 | 5/1977 | Nordin .................................. | 60/572 |
| 4,406,191 | 9/1983 | Armitage .............................. | 60/538 X |
| 4,607,998 | 8/1986 | Hawkes ................................ | 60/545 X |
| 4,800,723 | 1/1989 | Clot et al. ............................. | 60/545 |
| 4,872,310 | 10/1989 | Kaye .................................... | 60/567 |
| 5,481,877 | 1/1996 | Bakke et al. ......................... | 60/571 |
| 5,533,336 | 7/1996 | Kiat et al. ............................. | 60/533 |

*Primary Examiner*—John E. Ryznic
*Attorney, Agent, or Firm*—Pillsbury Madison & Sutro, LLP

[57] ABSTRACT

A sealed hydraulic intensifier has a sealed hydraulic cylinder actuator having a cylinder defining a piston chamber, a piston fitted in the piston chamber of the cylinder, and a piston rod connected to the piston, and a pressure controller disposed adjacent to the piston chamber of the sealed hydraulic cylinder actuator to control.

5 Claims, 9 Drawing Sheets

SEALED HYDRAULIC INTENSIFIER

BACKGROUND OF THE INVENTION

1. Field of the Invention

The present invention relates to a sealed hydraulic intensifier and, more specifically, to a sealed hydraulic intensifier which is effectively applicable to a mold clamping mechanism for an injection molding machine or the like.

2. Description of the Related Art

In a mold clamping mechanism included in an injection molding machine, a movable plate is moved to clamp a mold between the movable plate and a fixed plate and to open the mold. The mold clamping mechanism must be able to clamp the mold by a high mold clamping force to keep the mold closed against a high injection pressure applied to a molten polymer in the mold. Conventional mold clamping mechanisms having such a function include mold clamping mechanisms of a boost ram system having a boost ram inserted in the clamping ram of a clamping cylinder actuator, mold clamping mechanisms of a side cylinder actuator system having a plurality of side cylinder actuators in addition to a clamping cylinder actuator, and mold clamping mechanisms of a pressure intensifying cylinder actuator system provided with a pressure intensifying cylinder actuator connected in series to a clamping cylinder actuator. A straight hydraulic mold clamping mechanism capable of quickly closing and opening a mold and of clamping the mold by a high pressure has widely been used.

A conventional straight hydraulic mold clamping mechanism needs a complicated hydraulic power system using clamping cylinder with high capacity to close and open the mold quickly and to exert a sufficiently high clamping pressure to the mold, and needs a fluid tank for containing working fluid to be supplied to a clamping cylinder actuator. Particularly, the straight hydraulic mold clamping mechanism of a boost ram system and that of a side cylinder system need a high-pressure pump to apply a high clamping force to a mold. The straight hydraulic mold clamping mechanism of a pressure intensifying cylinder actuator system has a relatively great length.

A prior art mold clamping mechanism having a combination of a ball screw and cylinder is disclosed in JP-B No. 89-17851.

This prior art mold clamping mechanism is provided with a first double-acting cylinder having a first and second pressure chamber and a second double-acting cylinder having a booster chamber. The first and second pressure chamber have volume which vary by the same volume according to the movement of a double-acting ram. In the clamping mechanism, a valve is operated so as to connect the pump to the first and the second pressure chamber, and the pump is driven to operate the first double-acting cylinder actuator to open and close the mold. The valve is operated so as to disconnect the pump from the first and the second pressure chamber, and the screw mechanism is driven to operate the second double-acting cylinder actuator for a mold clamping operation.

When the mold clamping mechanism operates to open (or close) the mold, the working fluid filling up the first and the second pressure chamber and the liquid passage is driven for flowing by the pump to advance (or retract) the double-acting ram. Therefore, the mold clamping mechanism does not need any external tank for storing the working fluid.

A conventional mold clamping mechanism is provided with a screw mechanism driven by an ac servomotor to move a movable plate in opposite directions. The servomotor and the screw mechanism for transmitting a mold clamping force of this mold clamping mechanism need inevitably to be large to apply a sufficiently high clamping force to the mold.

Another prior art mold clamping mechanism for an injection molding machine, proposed in JP-A No. 94-246806 comprises a improved screw mechanism having a nut provided with an internal screw thread and a screw shaft linked to the nut; a servomotor for driving the nut of the screw mechanism.

This prior art mold clamping mechanism is provided with a clamping force intensifying mechanism having the screw shaft engaging with the nut driven by the servomotor. When the screw shaft compresses the liquid sealed in the sealed bag, enhanced pressure of the liquid sealed in the sealed bag is produced as a high clamping force.

However, the intensifying mechanism has such disadvantages that hydraulic fluid may leak from the sealed bag and the high clamping force can not be securely maintained.

Accordingly, it is an object of the present invention to provide a sealed hydraulic intensifier which has a simple and compact mechanism and a high degree of flexibility of design.

It is an another object of the present invention to provide a sealed hydraulic intensifier which achieves an appropriate intensifying action to maintain a high clamping force to a predetermined value and is securely supplied with hydraulic fluid, and free from hydraulic fluid leakage.

SUMMARY OF THE INVENTION

According to a first aspect of the present invention, a sealed hydraulic intensifier for providing an increased force by using a working fluid comprises: a sealed hydraulic cylinder actuator having a cylinder defining a piston chamber and provided with a bore, a piston sealed in the piston chamber, and a piston rod connected to the piston to provide an increased force increased by the piston thereon; a pressure controller for controlling the pressure of the working fluid to be supplied to the piston chamber; a pressure applying member axially movably fitted in the bore of the cylinder; a driving means including a servomotor for axially moving the pressure applying member; an output measuring means for measuring an output force provided by the sealed hydraulic cylinder actuator on the bases of a pressure of the working fluid produced in the piston chamber or a pressure appeared on the piston rod; and a servomotor control means for controlling the servomotor so that the output force measured by the output measuring means coincides with a set value.

According to an another aspect of the present invention, sealed hydraulic intensifier for providing an increased force by using a working fluid, said sealed hydraulic intensifier comprising:a sealed hydraulic cylinder actuator having a cylinder defining a piston chamber, a piston fitted in the piston chamber, and a piston rod connected to the piston to provide thereon an increased force increased by the piston; a pressure controller having a pressure chamber for controlling the pressure of the working fluid to be supplied,to the piston chamber; a line connecting the pressure controller to the piston chamber; a pressure applying member axially movably disposed in the pressure controller for applying pressure on the working fluid in the pressure chamber; a driving means for anally moving the pressure applying member;

an output measuring means for measuring an output force provided by the sealed hydraulic cylinder actuator on the bases of a pressure of the working fluid produced in the piston chamber or a pressure appeared on the piston rod; and a control means for controlling the driving means so that the output force measured by the output measuring means coincides with a set value.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

Figure 1:
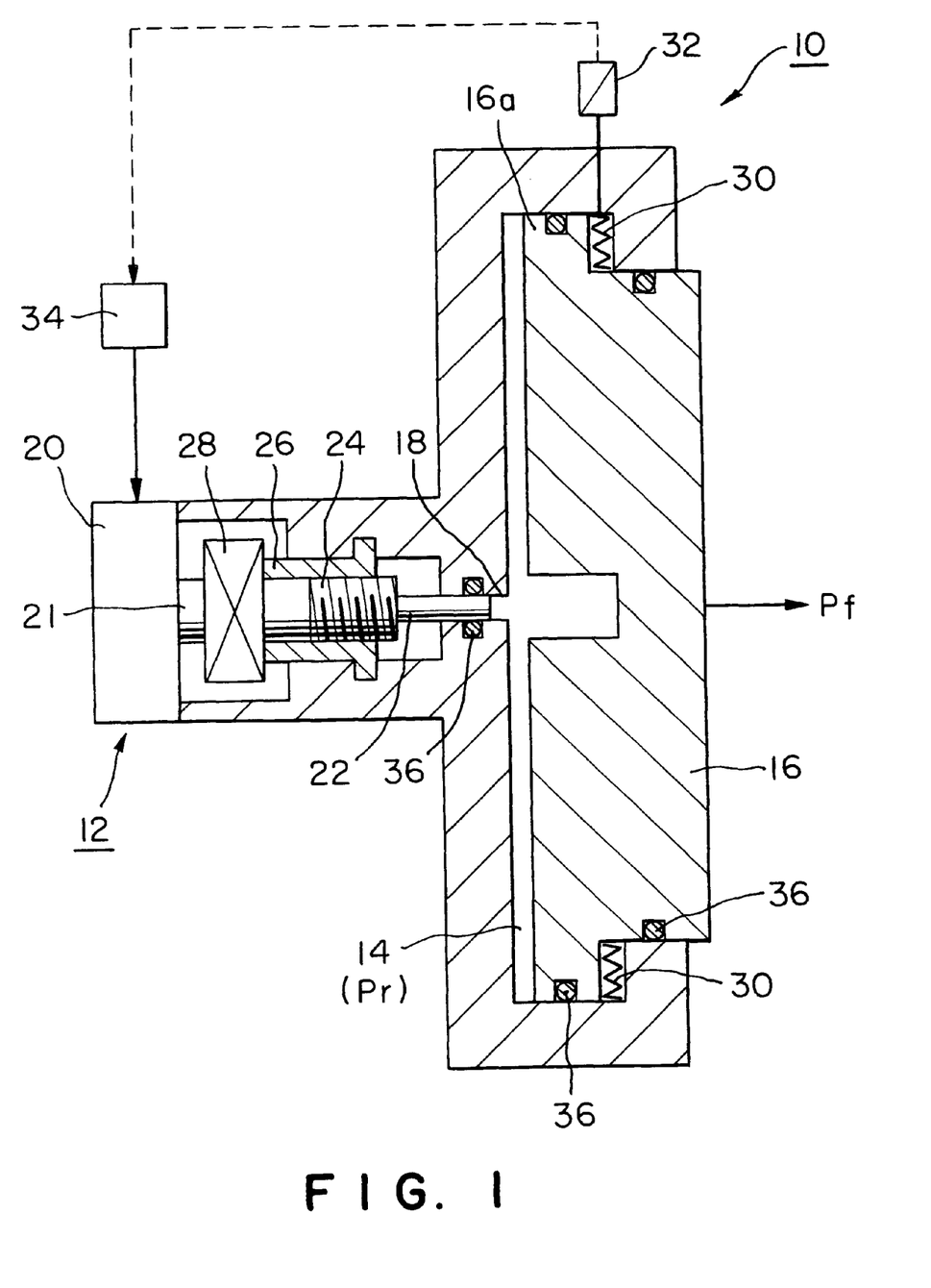
FIG. 1 is a schematic sectional view of a sealed hydraulic intensifier in a first embodiment according to the present invention.

Referring to FIG. 1, a sealed hydraulic intensifier in a first embodiment according to the present invention has a sealed hydraulic cylinder actuator 10, and a pressure controller 12. The sealed hydraulic cylinder actuator 10 has a piston 16a connected to a piston rod 16 and fitted in a piston chamber 14 formed in a cylinder included in the sealed hydraulic cylinder actuator 10. The pressure controller 12 integrally connected to the cylinder of the hydraulic cylinder actuator 10 controls the pressure of a hydraulic fluid exerting upon the piston 16a to convert the hydraulic pressure into a intensified output force through the piston rod 16.

A liquid passage 18 coaxial with the piston rod 16 communicates the piston chamber 14 through pressure controller 12. A ram 22 which has a smaller diameter than that of the piston 16a and is driven by a servomotor is fitted into the liquid passage 18 so as to be axially movable. A feed screw shaft 24 is joined coaxially to the ram 22. The nut 26 which engages with the feed screw shaft 24 is connected to the output shaft 21 of the servomotor 20 by a coupling member 28. The coupling member 28 have splines which couple the nut 26 and the output shaft 21 to transmit the output torque of the servomotor 20, to the nut 26. The feed screw shaft 24 converts the rotation of the nut 26 to liner motion to move the ram 22 axially.

A return spring 30 for returning back the piston 16a is disposed in a space defined by the backside of the piston 16a and the inner wall of the cylinder of the hydraulic cylinder actuator 10. When no hydraulic pressure Pr is applied to the piston chamber 14, the piston 16a is returned to its initial position by the return spring 30. A pressure sensor 32 determines indirectly a pressure Pr in the piston chamber 14 or the output force Pf which exerts on the piston rod 16 by way of the measurement of the pressure of air in the space in which the return spring is placed. The pressure sensor 32 gives a signal corresponding to the measured pressure of air in the space to a servomotor controller 34. The servomotor controller 34 drives the servomotor 20 so that the pressure of air measured by the pressure sensor 32 is equal to a predetermined set value corresponding to the pressure Pr or the output force Pf.

Sealing members 36, such as O rings, are placed in necessary parts between the moving components and the corresponding stationary components of the hydraulic intensifier as seals against high pressure.

The pressure sensor 32 may be substituted by a strain gage combined with the return spring 30 and capable of converting the strain of the return spring 30 into a corresponding output force Pf.

According to the sealed hydraulic intensifier, the feed screw shaft 24 driven by the servomotor 20 causes ram 22 to move axially toward the piston chamber 14 in the liquid passage 18 so as to apply-hydraulic pressure to the piston 16a having larger sectional area than that of the ram 22, thereby exerting the predetermined force Pf on the piston rod 16. The simple and compact mechanism of the sealed hydraulic intensifier has a high degree of flexibility of design. Moreover, the piston chamber 14 is sealed securely by the sealing members 36, and is free from the leakage of the hydraulic fluid and noise generation.

Although the liquid passage 18 is coaxial with the piston rod 16 in this embodiment, the liquid passage 18 need not necessarily be coaxial with the piston rod 16 because the intensified hydraulic pressure Pr in the piston chamber 14 exerts uniformly on the surface of the piston 16a regardless of the position where the liquid passage 18 locates.

Second Embodiment

A sealed hydraulic intensifier in a second embodiment according to the present invention will be described with reference to FIG. 2, in which parts like or corresponding to those shown in FIG. 1 are designated by the same reference characters and the description thereof will be omitted.

The sealed hydraulic intensifier in the second embodiment has a liquid passage 18 different from that of the sealed hydraulic intensifier in the first embodiment. The liquid passage 18 of the sealed hydraulic intensifier in the second embodiment has a first section similar to the liquid passage 18 of the sealed hydraulic intensifier in the first embodiment and coaxial with the piston 16a, and a second section 18a extending perpendicularly to the first section. A ram 22 is fitted in the second section 18a so as to be moved axially by a ball screw mechanism having a nut 26, and a screw shaft 24 linked to the nut 26 and connected to the ram 22. The screw mechanism is driven by a servomotor 20 to move the ram 22 axially in the second section 18a of the fluid passage 18.

Since the second section 18a of the liquid passage 18 is extended perpendicularly to the axis of the piston 16a, and a pressure controller 12 is disposed on an extension of the second section 18a of the liquid passage 18, the length L, i.e., a dimension parallel to the axis of the piston 16a is shorter than the length L of the sealed hydraulic intensifier in the first embodiment, which facilitates the installation of the sealed hydraulic intensifier in combination with other devices such as a clamping apparatus.

Third Embodiment

Figure 3:
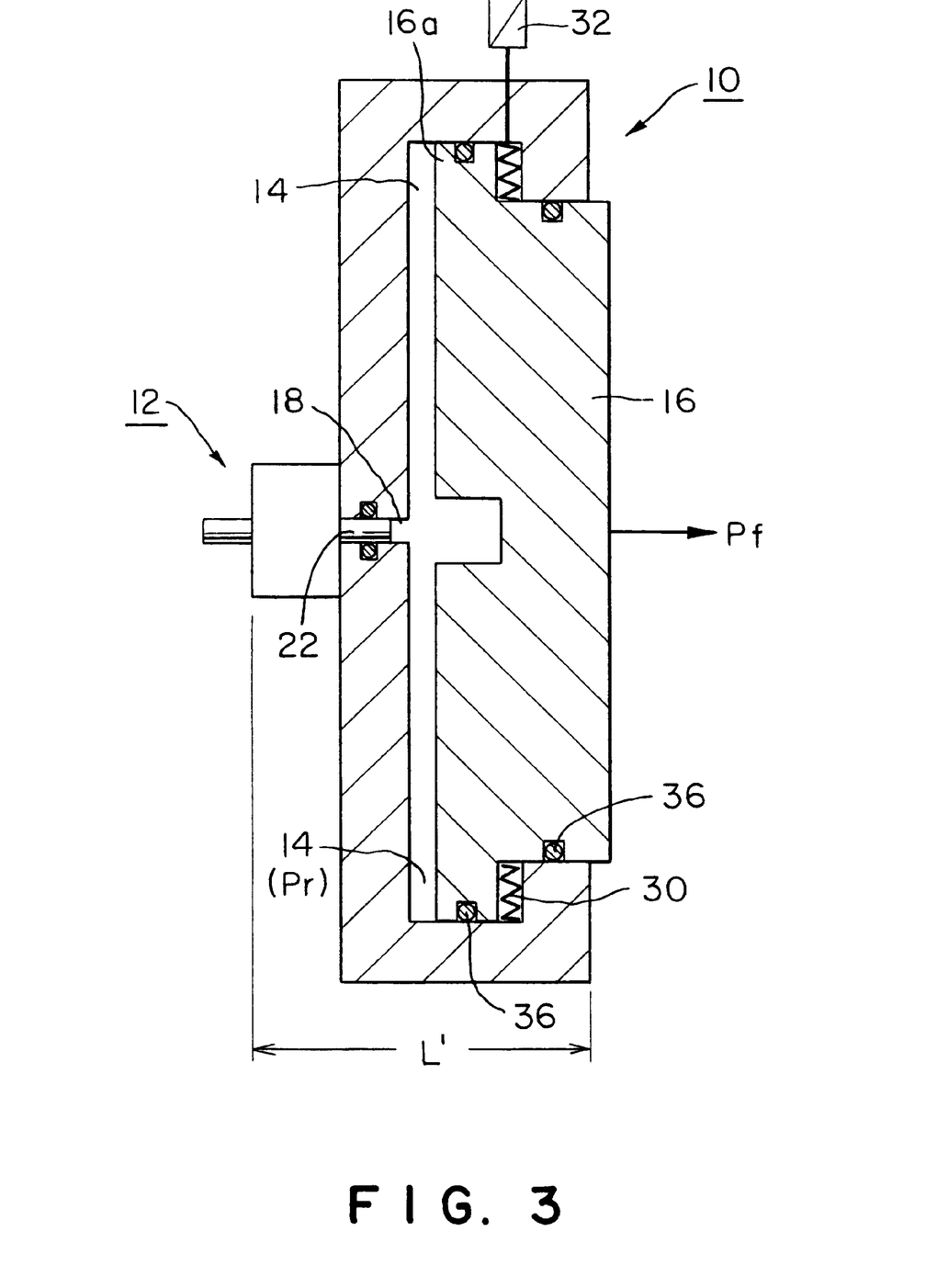
FIG. 3 is a schematic sectional view of a sealed hydraulic intensifier in a third embodiment according to the present invention.
Figure 4:
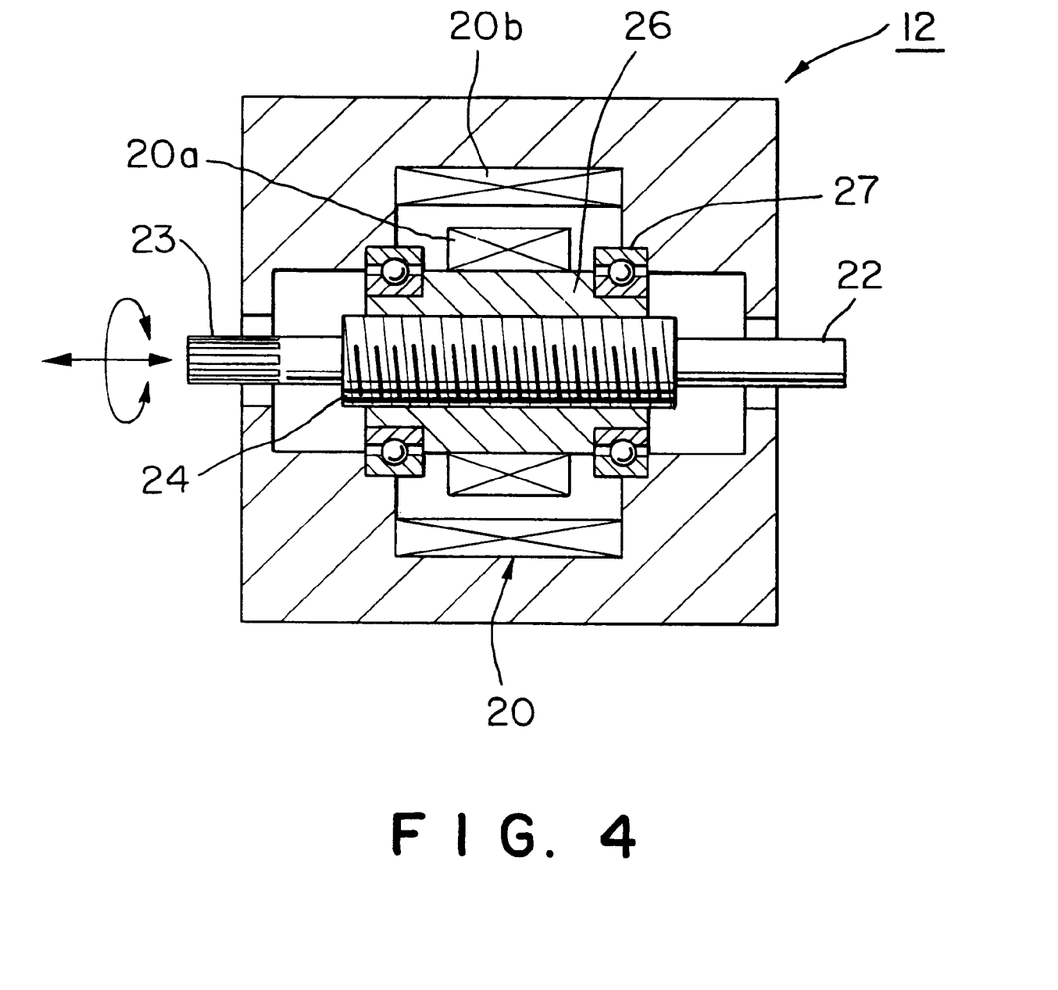
FIG. 4 is an enlarged schematic sectional view of an essential part of a pressure intensification controller included in the sealed hydraulic intensifier of FIG. 3.

A sealed hydraulic intensifier in a third embodiment according to the present invention illustrated in FIGS. 3 and 4 is similar in construction to the sealed hydraulic intensifier in the first embodiment, except that a pressure controller 12 included in the sealed hydraulic intensifier in the third embodiment is provided with a built-in servomotor 20.

Referring to FIG. 4, the pressure controller 12 comprises a nut 26 provided with an internal screw thread and supported rotatably by bearings 27 in a casing, a feed screw shaft 24 engaged with the nut 26, a ram 22 joined to one end of the feed screw shaft 24 coaxially with the latter, a splined shaft 23 joined to the other end of the feed screw shaft 24 coaxially with the latter, and the built-in servomotor 20 having a rotor core 20a mounted integrally on the nut 26 and a stator coil 20b supported on the inner surface of the casing so as to surround the rotor core 20a. The nut 26 rotates together with the rotor core 20a of the servomotor 20.

As shown in FIG. 3, the pressure controller 12 is connected to the cylinder of the hydraulic cylinder actuator 10 having a piston 16a fitted in a piston chamber 14 formed in the cylinder so that the ram 22 is fitted for axial movement in a liquid passage 18 formed in the cylinder of the hydraulic cylinder actuator 10. According to the third embodiment, length L', i.e., a dimension parallel to the axis of a piston 16a fitted in the piston chamber 14 of the cylinder is shorter than the length of the sealed hydraulic intensifier in the first embodiment of the same configuration, which facilitate the installation of the sealed hydraulic intensifier in combination with other devices such as a clamping apparatus.

Fourth Embodiment

Figure 2:
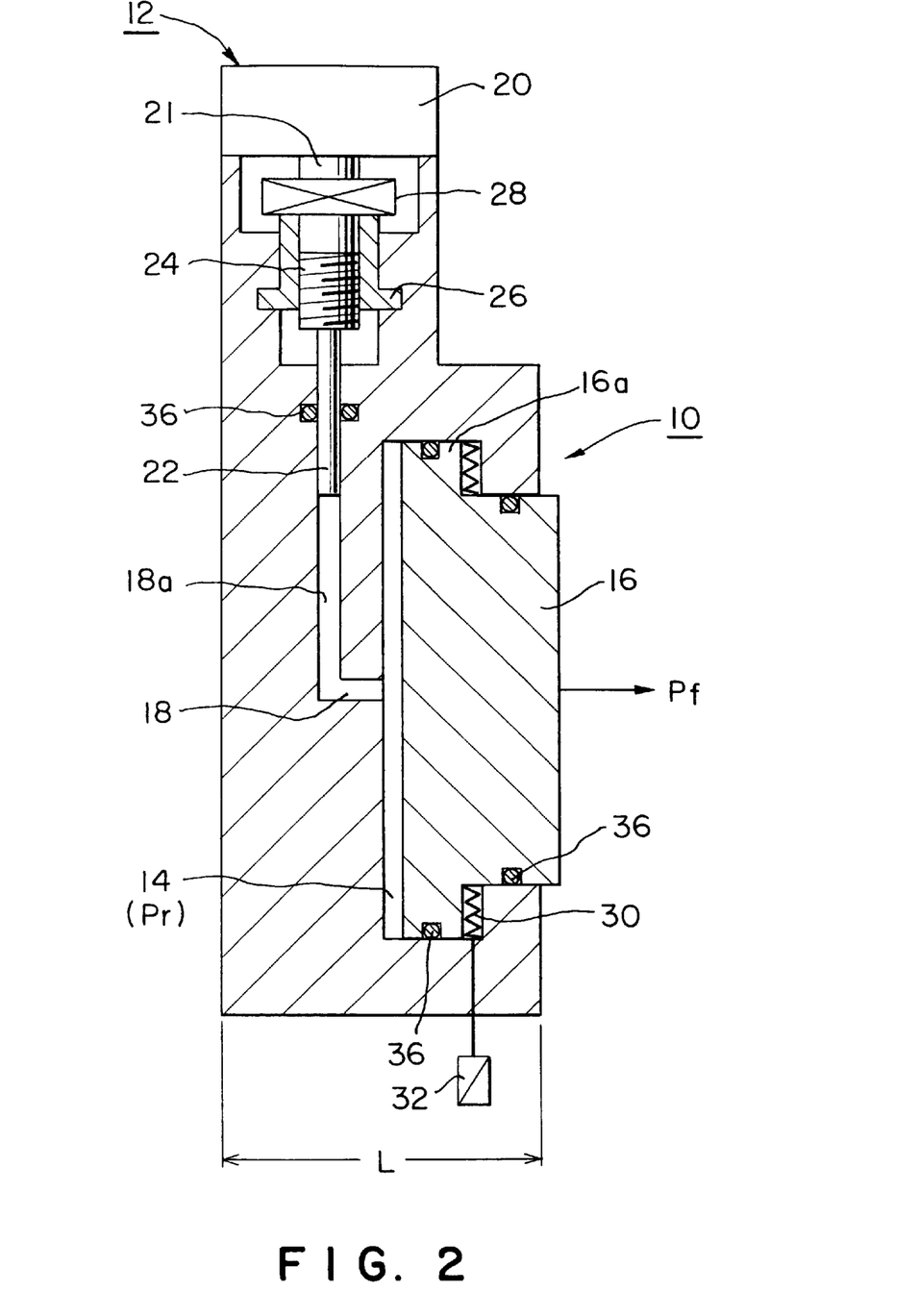
FIG. 2 is a schematic sectional view of a sealed hydraulic intensifier in a second embodiment according to the present invention.
Figure 5:
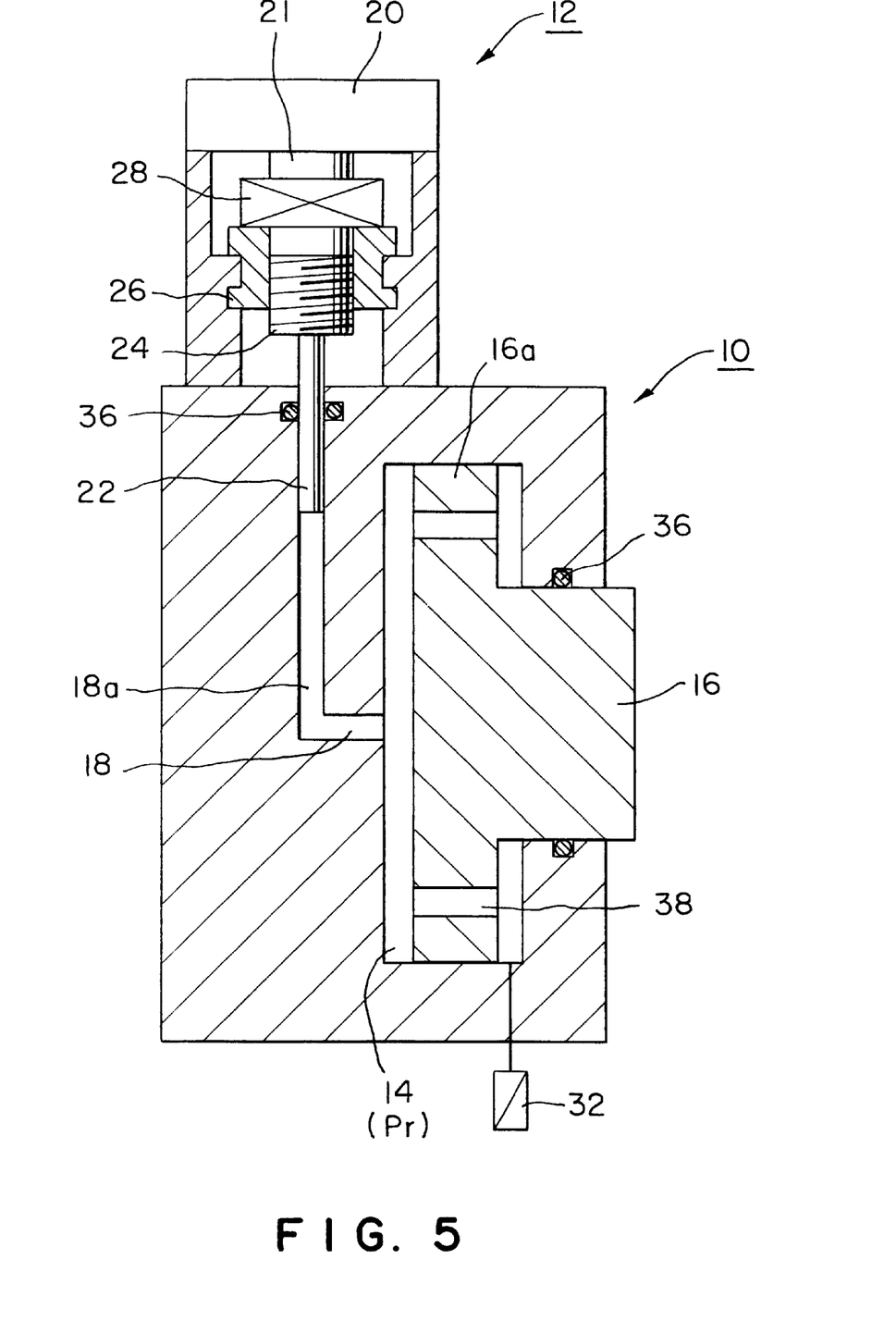
FIG. 5 is a schematic sectional view of a sealed hydraulic intensifier in a fourth embodiment according to the present invention.

A sealed hydraulic intensifier in a fourth embodiment according to the present invention shown in FIG. 5 is similar in construction to the sealed hydraulic intensifier in the second embodiment shown in FIG. 2, except that the sealed hydraulic intensifier in the fourth embodiment is provided with a piston 16a different from that of the sealed hydraulic intensifier in the second embodiment.

The piston 16a is fitted in a piston chamber 14 formed in the cylinder of a hydraulic cylinder actuator 10. The piston 16a has a first surface facing a pressure chamber of the piston chamber 14, i.e., a left surface, as viewed in FIG. 5, and a second surface facing a back pressure chamber of the piston chamber 14, i.e., a right surface, as viewed in FIG. 5, having an area smaller than that of the first surface. The piston 16a is provided with holes 38 by means of which the pressure chamber and the back pressure chamber communicate with each other. A pressure sensor 32 measures the pressure Pr in the piston chamber 14 directly. The hydraulic cylinder actuator 10 employed in the fourth embodiment is not provided with any components corresponding to the spring 30 and the sealing member 36 creating a nonleaking seals between the piston 16a and the circumferential surface of the piston chamber 14 of the hydraulic cylinder actuator 10 employed in the second embodiment.

Example 1 of Practical Application

Figure 6:
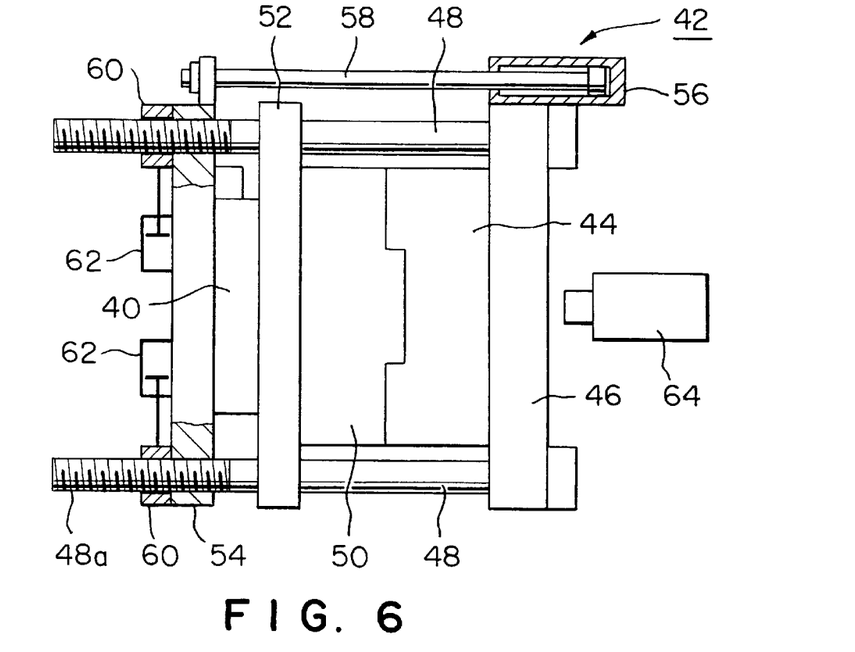
FIG. 6 is a schematic side view of a mold clamping mechanism in a first example employing a sealed hydraulic intensifier similar to that shown in FIG. 2 and applied to an injection molding machine.

FIG. 6 is a schematic side view of a mold clamping mechanism 42 in Example 1 employing a sealed hydraulic intensifier 40 similar to the forgoing embodiments and applied to an injection molding machine.

Referring to FIG. 6, a mold clamping mechanism 42 has a fixed plate 46 holding a fixed mold 44, a movable plate 52 holding a movable mold 50, tie bars 48 supporting the movable plate 52 for closing and opening of the mold, a connecting plate 54 supported behind the movable plate 52 on the tie bars 48, and the sealed hydraulic intensifier 40 interposed between the movable plate 52 and the connecting plate 54. The sealed hydraulic intensifier of the second embodiment (FIG. 2) is preferably applicable to the intensifier 40.

The connecting plate 54 is moved axially by a cylinder actuator 56 fixedly held on the fixed plate 46 and having a piston rod 58 connected to the connecting plate 54. Half nuts 60 attached to the back surface of the connecting plate 54 are capable of being brought into engagement with externally threaded sections 48a of the tie bars 48, respectively. The half nuts 60 are tightened by cylinder actuators 62. In FIG. 6, indicated at 64 is a nozzle included in the injection molding machine.

When clamping the fixed mold 44 and the movable mold 50 by the mold clamping mechanism 42, the cylinder actuator 56 advances the connecting plate 54 and the movable plate 52 toward the fixed plate 46. Upon the arrival of the movable mold 50 at a close position away a short distance before the fixed mold 44, the cylinder actuators 62 are driven to bring the half nuts 60 into tight engagement with the externally threaded sections 48a of the tie bars 48 so that the connecting plate 54 is interlocked with the tie bars 48.

Meanwhile, the servomotor 20 of the sealed hydraulic intensifier 40 is actuated to advance the ram 22 so that the pressure in the piston chamber 14 is raised to exert a high-pressure on the piston 19a having the enlarged sectional area. The piston rod 16 transmits a intensified mold clamping force to the movable plate 52.

As mentioned above with reference to FIG. 2, the servomotor controller 34 (FIG. 2) controls the servomotor 20 on the basis of the output signal of the pressure sensor 32 so that the sealed hydraulic intensifier 40 generates an predetermined mold clamping force appropriately.

Example 2 of Practical Application

Another application of a mold clamping mechanism 42 for a injection molding machine in Example 2 will be described with reference to FIG. 7, in which parts like or corresponding to those shown in FIG. 6 are designated by the same reference characters and the description thereof will be omitted.

Figure 7:
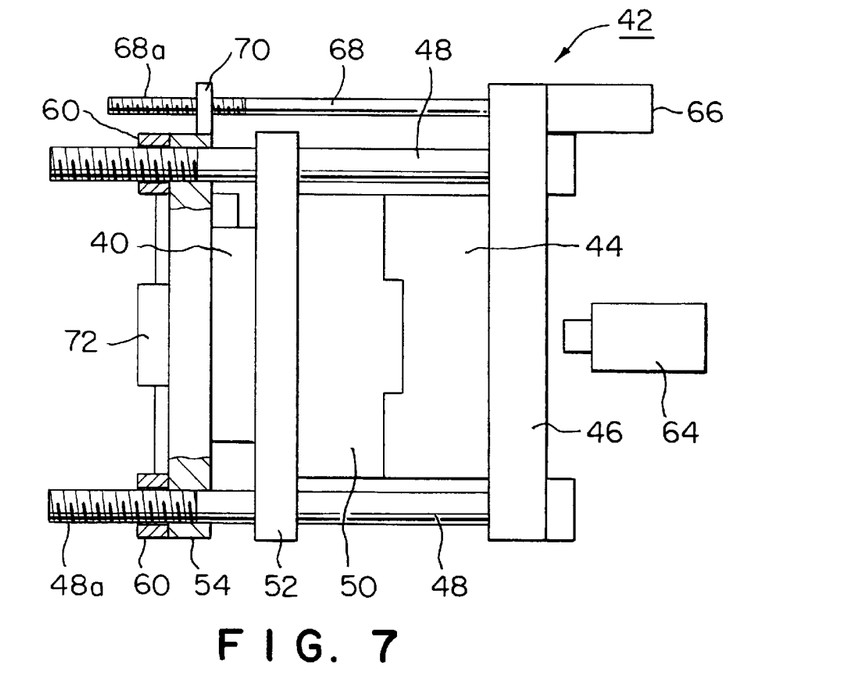
FIG. 7 is a schematic side view of a mold clamping mechanism in a second example employing a sealed hydraulic intensifier similar to that shown in FIG. 2 and applied to an injection molding machine.

Referring to FIG. 7, the mold clamping mechanism 42 employs a sealed hydraulic intensifier 40 similar to that shown in FIG. 2, and is applied to an injection molding machine. The mold clamping mechanism 42 shown in FIG.

7, which is a modification of the mold clamping mechanism 42 shown in FIG. 6, employs a servomotor 66 instead of the cylinder actuator 56 employed in Example 1 to move the connecting plate 52, and a servomotor 72 instead of the cylinder actuators 62 employed in Example 1 to tighten the half nuts 60.

The servomotor 66 is coupled to a drive shaft 68 having an externally threaded section 68a. The externally threaded section 68a of the drive shaft 68 is linked to a nut 70 fixed to a connecting plate 54. When the drive shaft 68 rotates, the connecting plate 54 is moved toward or away from a fixed mold 44 according to the rotating direction of the drive shaft 68.

According to third embodiment, the servomotors 20, 66 and 72 are controlled for achieving a mold clamping operation and a mold opening/closing operation.

Fifth Embodiment

Figure 8:
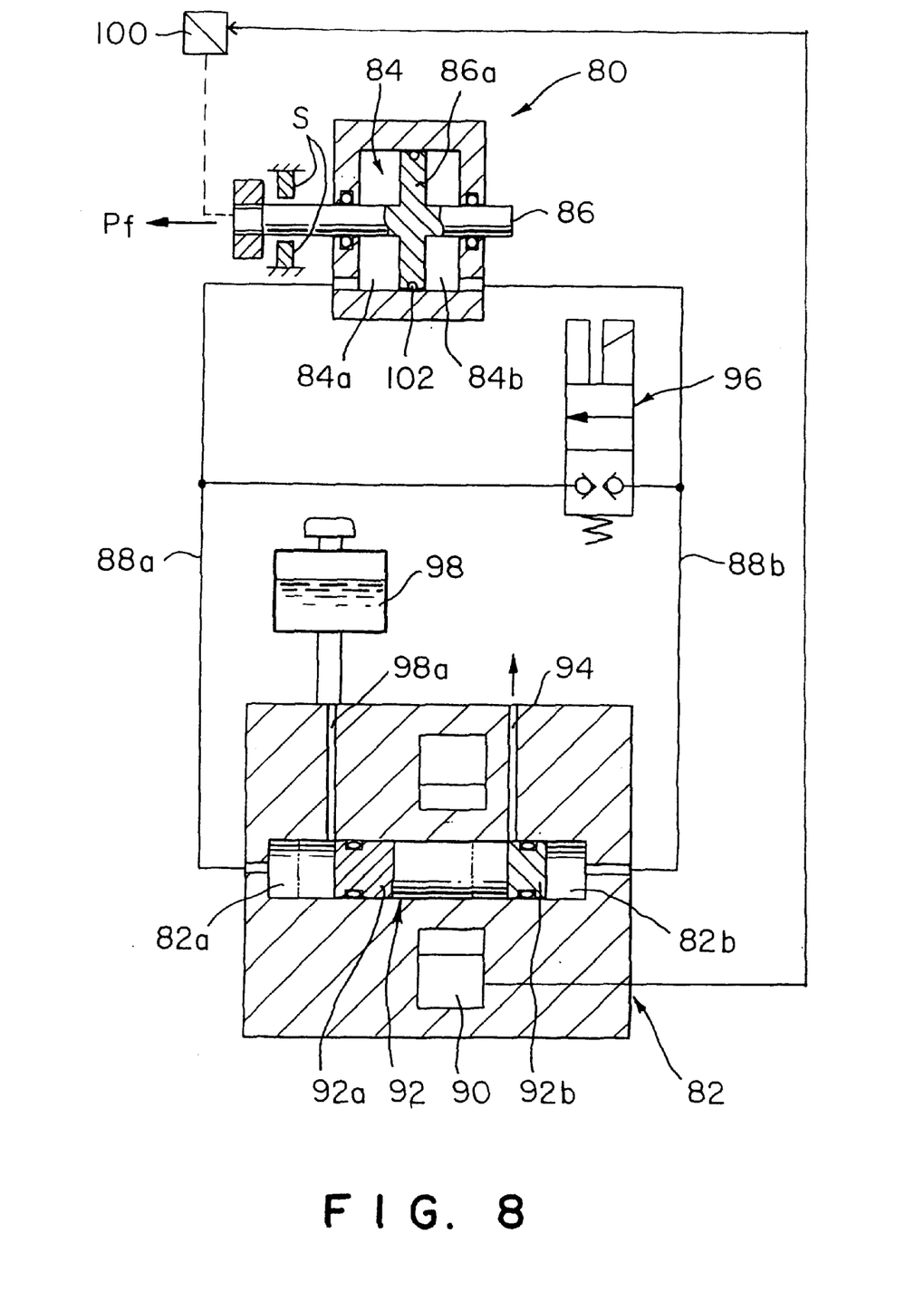
FIG. 8 is a schematic sectional view of a sealed hydraulic intensifier in a fifth embodiment according to the present invention.

FIG. 8 illustrates a sealed hydraulic intensifier in a fifth embodiment according to the present invention. The sealed hydraulic intensifier has, as principal components, a sealed hydraulic cylinder actuator 80, and a pressure controller 82. The sealed hydraulic cylinder actuator 80 comprises a cylinder defining a piston chamber 84, a piston 86a fitted in the piston chamber 84 of the cylinder to divide the piston chamber 84 into a first piston chamber 84a and a second piston chamber 84b, and a piston rod 86 fixedly connected to the piston 86a so as to extend on the opposite sides of the piston 86a.

The pressure controller 82 has a body provided with a cylindrical bore in which a pressure applying member 92 is disposed movably. The pressure applying member 92 divides the cylindrical bore into a pressure chamber 82a and a back pressure chamber 82b. The pressure chamber 82a of the pressure controller 82 is communicated with the first piston chamber 84a of the sealed hydraulic cylinder actuator 80 through a hydraulic line 88a, and the back pressure chamber 82b of the pressure controller 82 is communicated with the second piston chamber 84b of the sealed hydraulic cylinder actuator 80 through a hydraulic line 88b. The pressure controller 82 controls the pressures in the piston chambers 84a and 84b which exert on the piston 86a. The piston 86a having a larger sectional area than that of the pressure applying member 92 converts hydraulic pressure into a desired intensified mechanical force applying to a object member S through the piston rod 86.

The pressure applying member 92 of the pressure controller 82 is driven by a liner motor 90 and consists of two members 92a and 92b conning pressure chamber 82a and back pressure chamber 82b respectively. The pressure applying first member 92a serves as an inductive moving member which is driven by a linear motor 90. The first members 92a and second member 92b disposed in an axial arrangement, and the first member 92a is capable to take an independent movement.

A passage 94 which makes the back pressure chamber open into the atmosphere is formed in the cylinder of the pressure controller 82.

When the first pressure applying member 92a is moved to the left for pressure intensifying action, the piston rod 86 is moved to apply a predetermined intensified force Pf to a object member S.

In the case where the pressure applying member 92 is a single member, when the pressure applying member 92 is moved to the left, a negative pressure produced behind the pressure applying member 92 introduced to the second piston chamber 84b of the sealed hydraulic cylinder actuator 80, so that air and dust may possibly be sucked into the second piston chamber 84b.

According to this embodiment, since the pressure applying member 92 consists of the two members 92a and 92b, and forst member 92a is acting independently, any-negative pressure is not produced behind the second member 92b. Moreover, when the second member 92b is moved to the left due to the hydraulic liquid introduced to the back pressure chamber 82b from the second piston chamber 84b, the back pressure chamber 82b is brought open into the atmosphere through the passage 94. Any negative pressure is not produced in the back pressure chamber 82b of the pressure controller 82 and in the second piston chamber 84b of the sealed hydraulic cylinder actuator 80, thereby preventing dust from being sucked into the second piston chamber 82b.

A nonleakage valve 96 is provided in a circuit communicating the first piston chamber 84a with the second piston chamber 84b of the sealed hydraulic cylinder actuator 80. The nonleakage valve 96 is controlled by a control signal to interconnect the piston chambers 84a and 84b or to disconnect the same from each other.

A sealing member 102, such as an O ring, is placed in an annular groove formed in the circumference of the piston 86a to ensure the liquid-tight contact between the piston 86a and the cylinder of the sealed hydraulic cylinder actuator 80. If the hydraulic fluid leaks into the second piston chamber 84b through the sealing member 102, the nonleakage valve 96 is opened to introduce the hydraulic fluid in the second piston chamber 84a into the first piston chamber 84b.

If the hydraulic fluid leaks through the sealing member 102, the quantity of the working fluid in the hydraulic circuit of the pressure controller 82 will decrease and hence the hydraulic circuit must be replenished with the hydraulic fluid. A reservoir tank 98 containing the hydraulic fluid is installed which supply the hydraulic fluid to the hydraulic circuit through a replenishing passage 98a formed in the body of the cylinder of the pressure controller 82. The pressure chamber 82a and fluid passage 88a is replenished with the hydraulic fluid immediately before the pressure intensifying action commences.

The hydraulic fluid having the pressure Pr is introduced into the first piston chamber 84a of the sealed hydraulic cylinder actuator 80, exerting the predetermined intensified force Pf on the object member S. A pressure sensor 100 measures the force Pf provided on the piston rod 86 or the pressure Pr of the working fluid in the first piston chamber 84a. The output signal of the pressure sensor 100 is given to a linear motor controller, not shown, to control the linear motor 90 according to the output signal of the pressure sensor 100 so that the predetermined force Pf is exerted on the member S.

According to this embodiment, as the output force Pf is retained to a predetermined value, the appropriate intensifying action can be achieved. And this embodiment ensures securely the recovery of the leaked working fluid and the replenishment of the hydraulic circuit with the working fluid.

Figure 9:
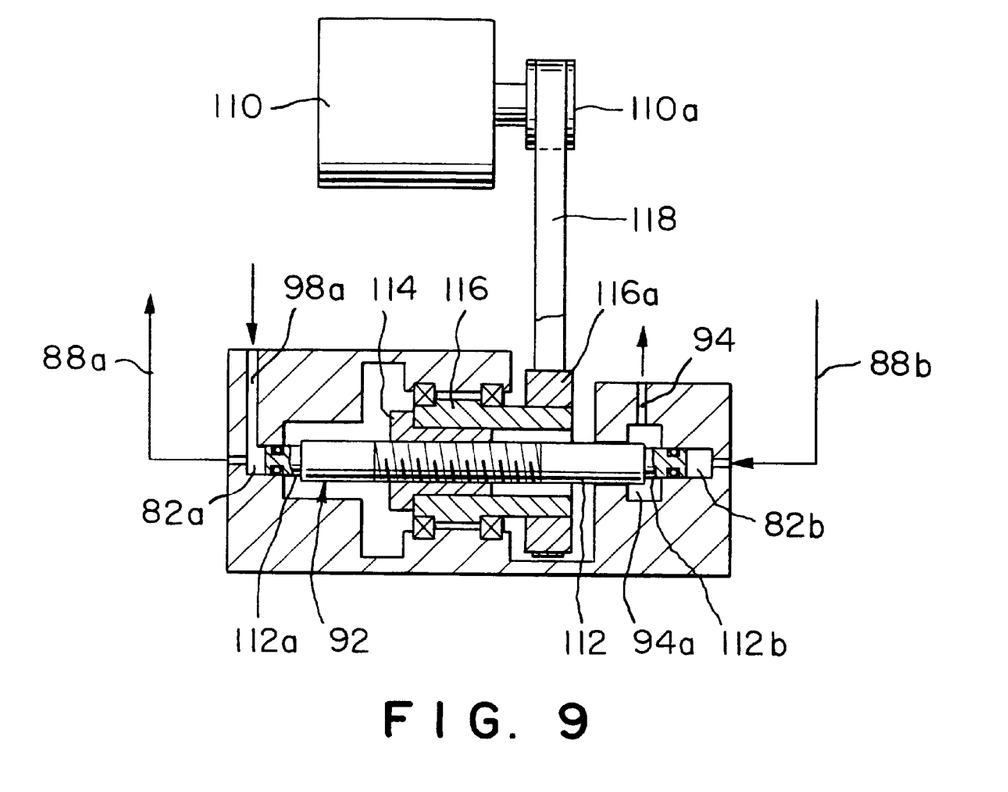
FIG. 9 is a schematic sectional view of an essential part of a modification of a ram driving mechanism included in the sealed hydraulic intensifier of FIG. 8.

FIG. 9 illustrates a pressure applying member driving mechanism in a modification of the sealed hydraulic intensifier of FIG. 8. As shown in FIG. 9, the driving mechanism employs a servomotor 110 instead of the built-in linear motor 90.

A ram 92 which is used as the pressure applying member has a threaded section 112, two pistons 112a and 112b formed at the opposite ends, respectively, of the threaded section 112. The pistons 112a and 112b are fitted in a pressure chamber 82a and a back pressure chamber 82b, respectively. The threaded section 112 is linked to a nut 114 forming a ball screw mechanism in combination with the threaded section 112. The nut 114 is fixedly fitted in a sleeve 116 rotatably supported by bearings on a body. A drive pulley 110a is mounted on the output shaft of the servomotor 110, a driven pulley 116a is mounted on the sleeve 116, and a drive belt 118 is stretched between the drive pulley 110a and the driven pulley 116a. The servomotor 110 drives the sleeve 116 for rotation through the drive pulley 110a, the drive belt 118 and the driven pulley 116a to rotate the nut 114. Consequently, the ram 92 is driven for axial movement. In FIG. 9, indicated at 94a is a chamber formed in the body so as to open into the atmosphere through a passage 94. The flnction of the ram driving mechanism is entirely the same as that of the ram driving mechanism included in the sealed hydraulic intensifier shown in FIG. 8.

Sixth Embodiment

Figure 10:
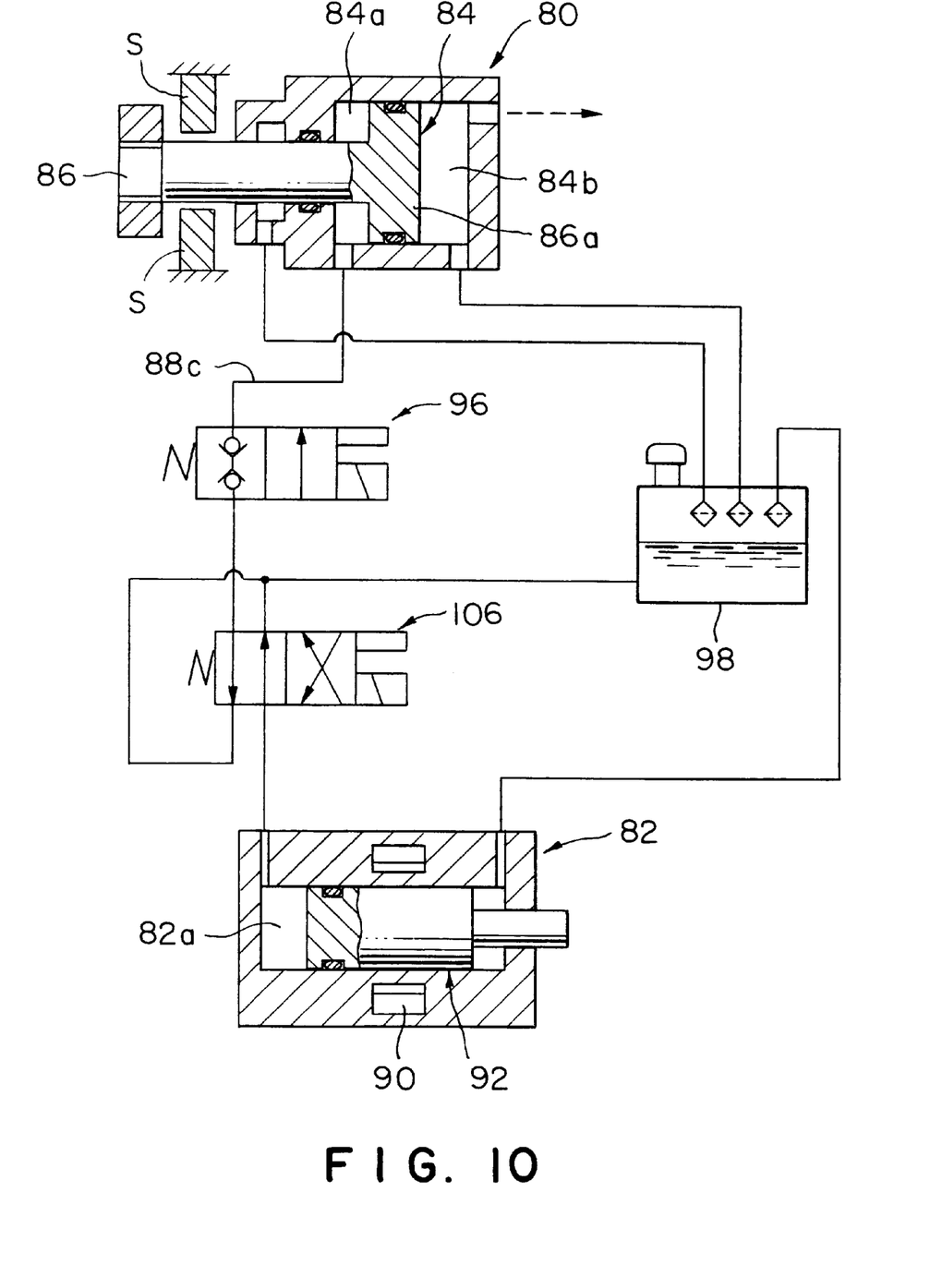
FIG. 10 is a schematic sectional view of a sealed hydraulic intensifier in a sixth embodiment according to the present invention.

Referring to FIG. 10, a sealed hydraulic intensifier in a sixth embodiment according to the present invention comprises a sealed hydraulic cylinder actuator 80, a pressure controller 82 and a hydraulic circuit including a nonleakage valve 96 and a directional control valve 106. The sealed hydraulic cylinder actuator 80 has a cylinder defining a piston chamber 84, a piston 86a fitted in the piston chamber 84, and a piston rod 86 formed integrally with the piston 86a. The piston chamber 84 is divided into a pressure chamber 84a and an atmospheric chamber 84b opened into the atmosphere by the piston 86a.

The nonleakage valve 96 is connected by a line 18c to the pressure chamber 84a. The directional control valve 106 is connected to a pressure chamber 82a formed in a cylinder included in the pressure controller 82. A reservoir tank 98 is connected to the directional control valve 106.

The pressure controller 82 has a cylinder defining a pressure chamber 82a, a ram 92 fitted in the pressure chamber 82a, and a built-in linear motor 90 using the ram as a moving element.

The operation of the sealed hydraulic intensifier as applied to a mold clamping mechanism for an injection molding machine will be described. In this case a member S shown in FIG. 10 is supposed to be the movable plate of the mold clamping mechanism.

(1) When clamping a mold by the mold clamping mechanism, both the directional control valve 106 and the nonleakage valve 96 are opened to transmit an increased pressure prevailing in the pressure chamber 82a of the pressure controller 82 to the pressure chamber 84a of the sealed hydraulic cylinder actuator 80.

(2) After the clamping operation of the mold clamping mechanism has been completed, both the directional control valve 106 and the nonleakage valve 96 are closed to disconnect the pressure chamber 82a of the pressure controller 82 from the pressure chamber 84a of the sealed hydraulic cylinder actuator 80 so that the increased pressure is maintained in the pressure chamber 84a of the sealed hydraulic cylinder actuator 80.

(3) When releasing the mold from the mold clamping mechanism, the directional control valve 106 is kept closed and the nonleakage valve 96 is opened to connect the pressure chamber 82a of the pressure controller 82 and the pressure chamber 84a of the sealed hydraulic cylinder actuator 80 to the tank 98 so that the pressure prevailing in the pressure chamber 84a is removed and the pressure chamber 82a is replenished with the working fluid.

Figure 11:
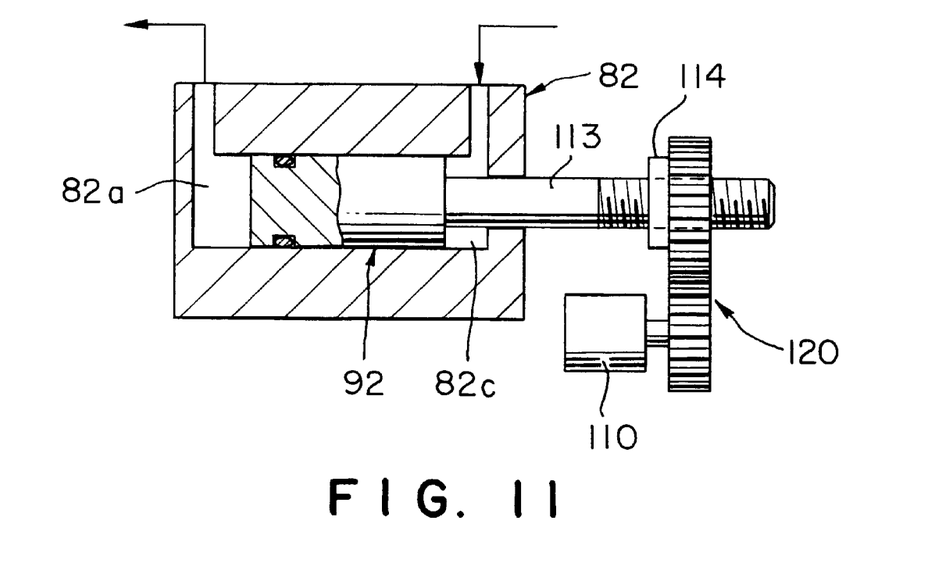
FIG. 11 is a schematic sectional view of an essential part of a modification of a ram driving mechanism included in the sealed hydraulic intensifier of FIG. 10.

FIG. 11 illustrates a modification of a ram driving mechanism included in the pressure controller 82 of the sealed hydraulic intensifier of FIG. 80. This modification employs a servomotor 110 instead of the liner motor 90 employed in the pressure controller 82 of FIG. 10.

Referring to FIG. 11, a screw shaft 113 is formed integrally with a ram 92 defining a pressure chamber 82a and a back pressure chamber 82b in a cylinder of the pressure controller 82. The screw shaft 43 is linked to a nut 114 provided with an internal screw thread to form a ball screw mechanism. The nut 114 is interlocked by a gearing 120 with the drive shaft of the servomotor 110. The function of the pressure controller 82 shown in FIG. 11 is entirely the same as that of the pressure controller 82 included in the sealed hydraulic intensifier illustrated in FIG. 10.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A sealed hydraulic intensifier for providing an increased force by using a working fluid, said sealed hydraulic intensifier comprising:

a sealed hydraulic cylinder actuator having a cylinder defining a piston chamber, a piston fitted in the piston chamber, and a piston rod connected to the piston to provide thereon an increased force increased by the piston;

a pressure controller having a pressure chamber for controlling the pressure of the working fluid to be supplied to the piston chamber;

a line connecting the pressure controller to the piston chamber;

a pressure applying member axially movably disposed in the pressure controller for applying pressure on the working fluid in the pressure chamber wherein the pressure applying member divides the pressure chamber so as to define a back pressure chamber and comprising two adjacently disposed component members, the back pressure chamber being opened to atmospheric pressure when the component members are moved to a specific position;

a driving means for axially moving the pressure applying member, wherein the driving means is an inductive linear motor capable of axially moving the pressure applying member;

an output measuring means for measuring an output force provided by the sealed hydraulic cylinder actuator on the bases of a pressure of the working fluid produced in the piston chamber or a pressure applied on the piston rod; and a control means for controlling the driving means so that the output force measured by the output measuring means coincides with a set value.

2. The sealed hydraulic intensifier according to claim 1, further comprising:

a nonleakage valve provided in a line interconnecting a first chamber formed on one side of the piston in the piston chamber and a second chamber formed on the other side of the piston in the piston chamber, said nonleakage valve being operated so as to connect or disconnect selectively the first chamber and the second pressure chamber.

3. The sealed hydraulic intensifier according to claim 1, further comprising a reservoir tank containing the working fluid to replenish the pressure chamber of the sealed hydraulic cylinder actuator, and a line connected to the reservoir tank for introducing the working fluid to the sealed hydraulic cylinder actuator.

4. A sealed hydraulic intensifier for providing an increased force by using a working fluid, said sealed hydraulic intensifier comprising:

- a sealed hydraulic cylinder actuator having a cylinder defining a piston chamber, a piston fitted in the piston chamber, and a piston rod connected to the piston to provide thereon an increased force increased by the piston;
- a pressure controller having a pressure chamber for controlling the pressure of the working fluid to be supplied to the piston chamber;
- a line connecting the pressure controller to the piston chamber;
- a pressure applying member axially movably disposed in the pressure controller for applying pressure on the working fluid in the pressure chamber;
- a driving device constructed and arranged to axially moving the pressure applying member;
- an output measuring device constructed and arranged to measure a pressure of air on a backside of the piston so as to determine an output force provided by the sealed hydraulic cylinder actuator; and
- a control device constructed and arranged to control the driving device so that the output force measured by the output measuring device coincides with a predetermined value.

5. The sealed hydraulic intensifier according to claim 4, wherein the driving means comprises a servomotor, and a screw mechanism capable of converting a rotating operation of a rotating component of the servomotor into a linear motion and transmitting the linear motion to the pressure applying member.

* * * * *